United States Patent
Hsieh et al.

(10) Patent No.: US 7,061,907 B1
(45) Date of Patent: Jun. 13, 2006

(54) SYSTEM AND METHOD FOR FIELD UPGRADEABLE SWITCHES BUILT FROM ROUTING COMPONENTS

(75) Inventors: Jenwei Hsieh, Austin, TX (US); Victor Mashayekhi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 734 days.

(21) Appl. No.: 09/670,077

(22) Filed: Sep. 26, 2000

(51) Int. Cl.
*H04L 12/50* (2006.01)

(52) U.S. Cl. .................. 370/360; 370/396; 370/398; 370/400

(58) Field of Classification Search ............... 370/401, 370/434, 463, 257, 360, 419–420, 386, 388, 370/352–356, 429; 709/250
See application file for complete search history.

(56) References Cited

U.S. PATENT DOCUMENTS

| | | | |
|---|---|---|---|
| 5,130,977 A | 7/1992 | May et al. | 370/60 |
| 5,140,583 A | 8/1992 | May et al. | 370/60 |
| 5,424,492 A | 6/1995 | Petty et al. | 174/250 |
| 5,485,455 A * | 1/1996 | Dobbins et al. | 370/255 |
| 5,546,596 A | 8/1996 | Geist | 395/200.02 |
| 5,590,287 A | 12/1996 | Zeller et al. | 395/250 |
| 5,628,637 A | 5/1997 | Pecone et al. | 439/74 |
| 5,669,008 A | 9/1997 | Galles et al. | 395/800.12 |
| 5,923,652 A * | 7/1999 | Daase et al. | 370/360 |
| 5,953,314 A * | 9/1999 | Ganmukhi et al. | 370/220 |
| 6,044,369 A | 3/2000 | Black | 707/4 |
| 6,052,738 A | 4/2000 | Muller et al. | 709/250 |
| 6,078,963 A * | 6/2000 | Civanlar et al. | 709/238 |
| 6,172,980 B1 * | 1/2001 | Flanders et al. | 370/401 |
| 6,463,067 B1 * | 10/2002 | Hebb et al. | 370/413 |
| 6,647,019 B1 * | 11/2003 | McKeown et al. | 370/422 |
| 6,687,247 B1 * | 2/2004 | Wilford et al. | 370/392 |

OTHER PUBLICATIONS

White Paper-Catalyst 8500 Architecture, Cisco, pp. 1-19, 1998.*
Aweya, IP Router Architecture: An Overview, http://citeseer.ist.psu.edu/aweya99ip.html, pp. 1-48, 1999.*
Partridge et al., A 50-Gb/s IP Router, IEEE, pp. 237-248, Jun. 1998.*
McKeown et al, Tiny Tera: A Packet Switch Core, IEEE, pp. 26-33, 1997.*
PMC-Sierra, Inc., A New Architecture for Switch and Router Design, pp. 1-8, 1999.*
Turner, Terabit Burst Switching, Progress Report, pp. 1-17, 1999.*

* cited by examiner

*Primary Examiner*—Frank Duong
(74) *Attorney, Agent, or Firm*—Baker Botts L.L.P.

(57) ABSTRACT

A system and method for providing field upgradeable switches built from ASIC-based routing components is disclosed. A network switch contains intermediate routing components and an interface that allows the switching component to couple with a module. The module contains additional routing components and may be coupled to the network switch as a simple field operation. When the module is coupled with the network switch, the routing components of the module are communicatively coupled with the intermediate routing components of the network switch. Thus, the network switch now contains additional routing components. As a result, the addition of the module enhances the internal topology of network switch and increases its effective bisectional bandwidth.

12 Claims, 6 Drawing Sheets

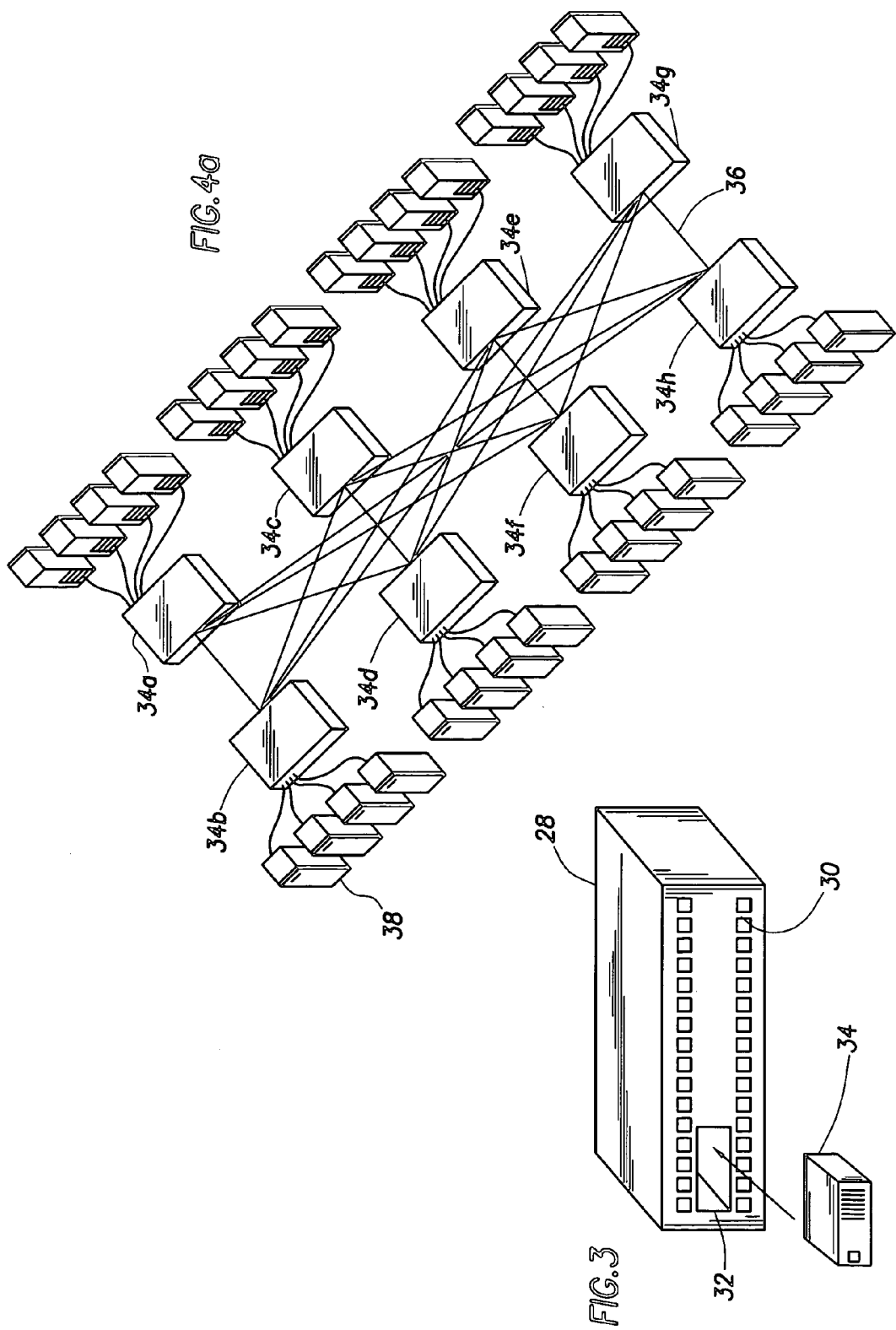

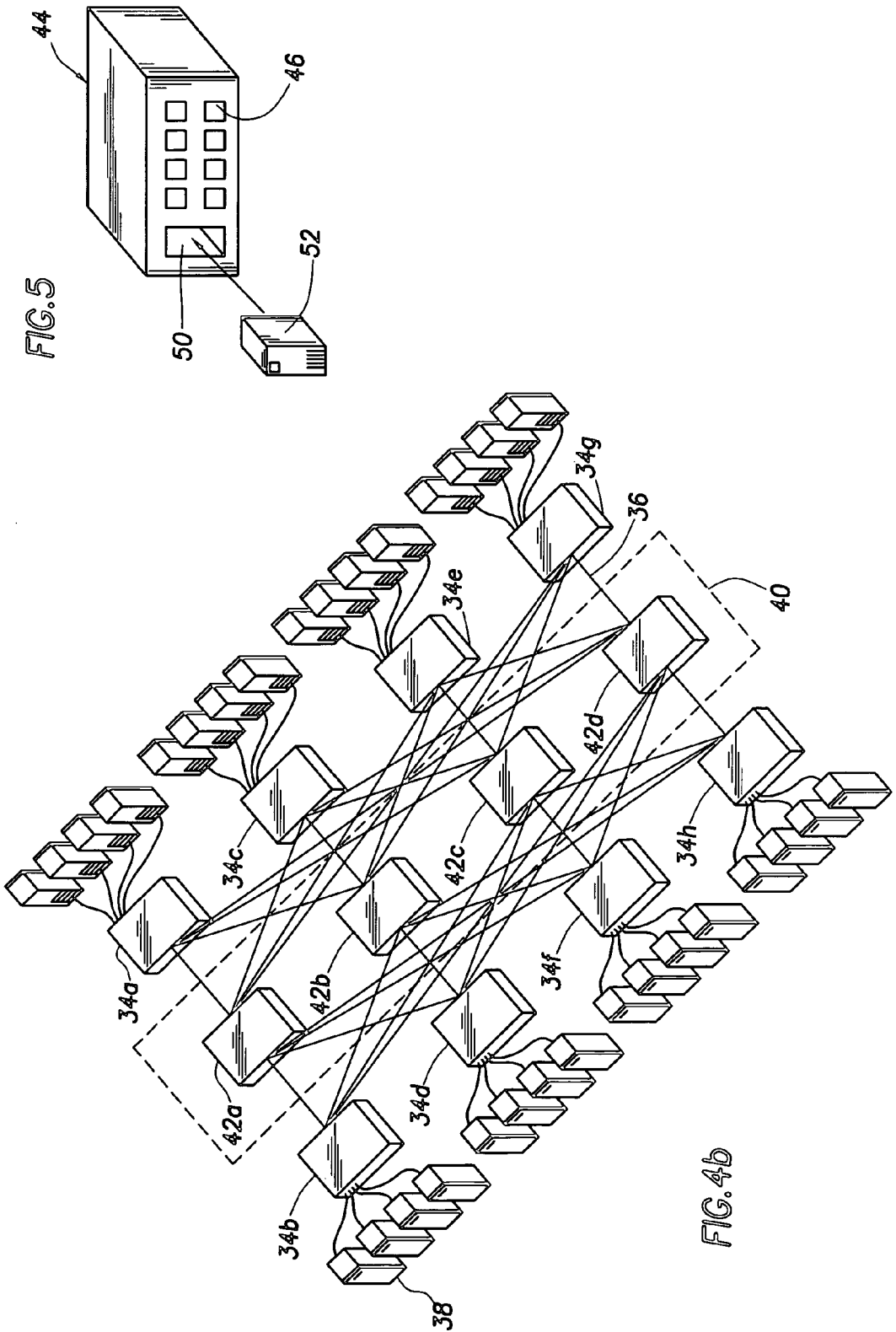

SYSTEM AND METHOD FOR FIELD UPGRADEABLE SWITCHES BUILT FROM ROUTING COMPONENTS

TECHNICAL FIELD

The present disclosure relates in general to the field of computer systems, and, more particularly, to a system and method for providing field upgradeable switches built from routing components in a computer network environment.

BACKGROUND

Computer networking environments such as Local Area Networks (LANs) and Wide Area Networks (WANs) permit many users, often at remote locations, to share communication, data, and resources. A storage area network (SAN) may be used to provide centralized data sharing, data backup, and storage management in these networked computer environments. The networks typically employ network switches to provide the routing functions necessary for the transmission of data between the various devices connected to the network. It is important that the network switch contain enough routing components to fully support the devices to which the network switch is connected. If the network switch does not contain a sufficient number of routing components, then the network switch may act a bottleneck and limit the effective bandwidth of the network. Therefore, as new devices are added to the computer network, a network administrator will generally ensure that the network switches are large enough to support the added devices.

Network switches generally posses a fixed internal topology, In other words, how the internal components interconnect is predetermined and cannot be changed. Therefore, the network switch is designed with a predetermined and fixed bandwidth. As a result, if a network switch is no longer sufficient to support the number of network devices to which it is attached, then the network switch must be replaced with a larger network switch. Generally, the expense of a switch will increase as more routing components are added. Thus, a switch that incorporates six routing components will be more expensive than a switch that incorporates four routing components. As a result, the process of upgrading a network is expensive. In addition, the upgrading a network is wasteful because the replaced network switches typically cannot be incorporated into the network.

SUMMARY

In accordance with teachings of the present disclosure, a system and method for providing field upgradeable switches built from routing components for a computer network environment are disclosed that provide significant advantages over prior developed systems.

A network switch is disclosed that contains the minimum number of routing components necessary to provide connections for the number of network devices that it is designed to support. Thus, while the network switch can inter-connect the devices, it does not provide full bandwidth interconnectivity. The network switch may receive an enhancement module. This module contains additional routing components. When the module is received by the network switch, the number of effective routing components contained in the switch is increased. As a result, the effective bandwidth of the network switch is increased. Thus, the network switch is field upgradeable. Network administrators who do not need a full-bandwidth switch can order the network switch without the module. Network administrators may later upgrade their network switch into a full-bandwidth switch with the module. The network switch is preferably built from ASIC-based routing chips with arbitrary routing ports.

A technical advantage of the present network switch is that it allows a network administrator to easily upgrade a network switch without having to perform additional hardware or software operations. Another technical advantage of the present network switch is that a network administrator may upgrade the network switch without having to incur the expense of replacing the network switch with a larger network switch. Another technical advantage of the present network switch is that it allows a network administrator to trade off bandwidth capability and expense to find the optimal balance for a given network.

Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a diagram of a 32-port network switch and module;

FIG. 4a is a diagram of the internal topology of a 32-port network switch 13 without the module;

FIG. 4b is a diagram of the internal topology of a 32-port network switch with the module;

FIG. 5 is a diagram of an 8-port network switch and module;

DETAILED DESCRIPTION

Figure 1:
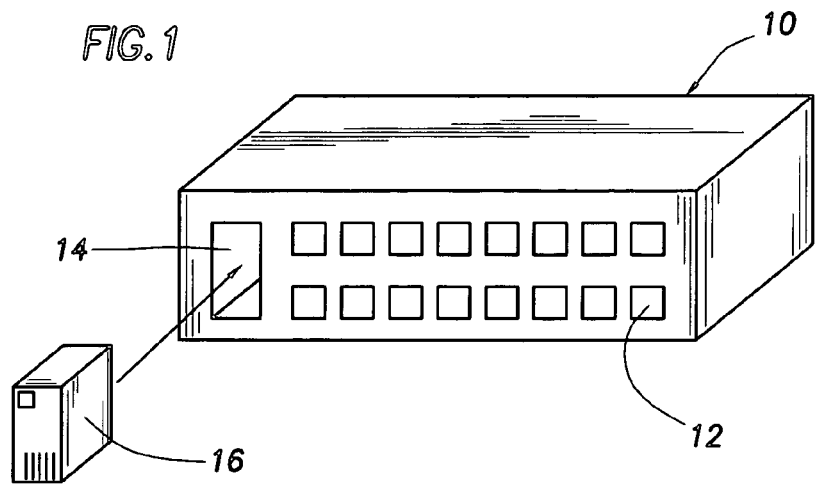
FIG. 1 is a diagram of a 16-port network switch and module.

Shown in FIG. 1 is a sixteen port switch 10, with ports 12, and a module interface 14 operable for accepting module 16 such that module 16 is communicatively coupled with switch 10. Switch 10 may be any device operable to communicatively couple networked devices. For example, switch 10 may be serve as a switch operable to filtering or forwarding packets of data between networked devices. Thus, switch 10 may operate at the data link layer and be responsible for physically passing data from one node to another. Switch 10 may also serve as a routing switch and perform routing functions. In this case, switch 10 operates at the network layer and is responsible for routing data from one node to another. Switch 10 may be a router operable to connect computer networks, such as LANs, SANs or other networks. For example, switch 10 may be operable to use headers and forwarding tables to determine packet destinations and communicate with other routers to configure the optimal route between any two hosts or nodes. Port 12 may be any interface suitable for coupling switch 10 to a network device such as a computer system or server.

The module interface 14 and module 16 are preferably designed such that the integration of module 16 may be performed without any additional hardware or software configuration. Once module 16 has been received by module interface 14, module 16 is communicatively coupled to switch 10. Thus, coupling module 16 with switch 10 is a simple field operation. Switch 10 may contain more than one module interface 14 so that more than one module 16 may be communicatively coupled to switch 10. The switch 10 shown in FIG. 1 comprises sixteen ports 12 and is therefore operable to provide interconnections between sixteen devices or systems.

Figure 2A:
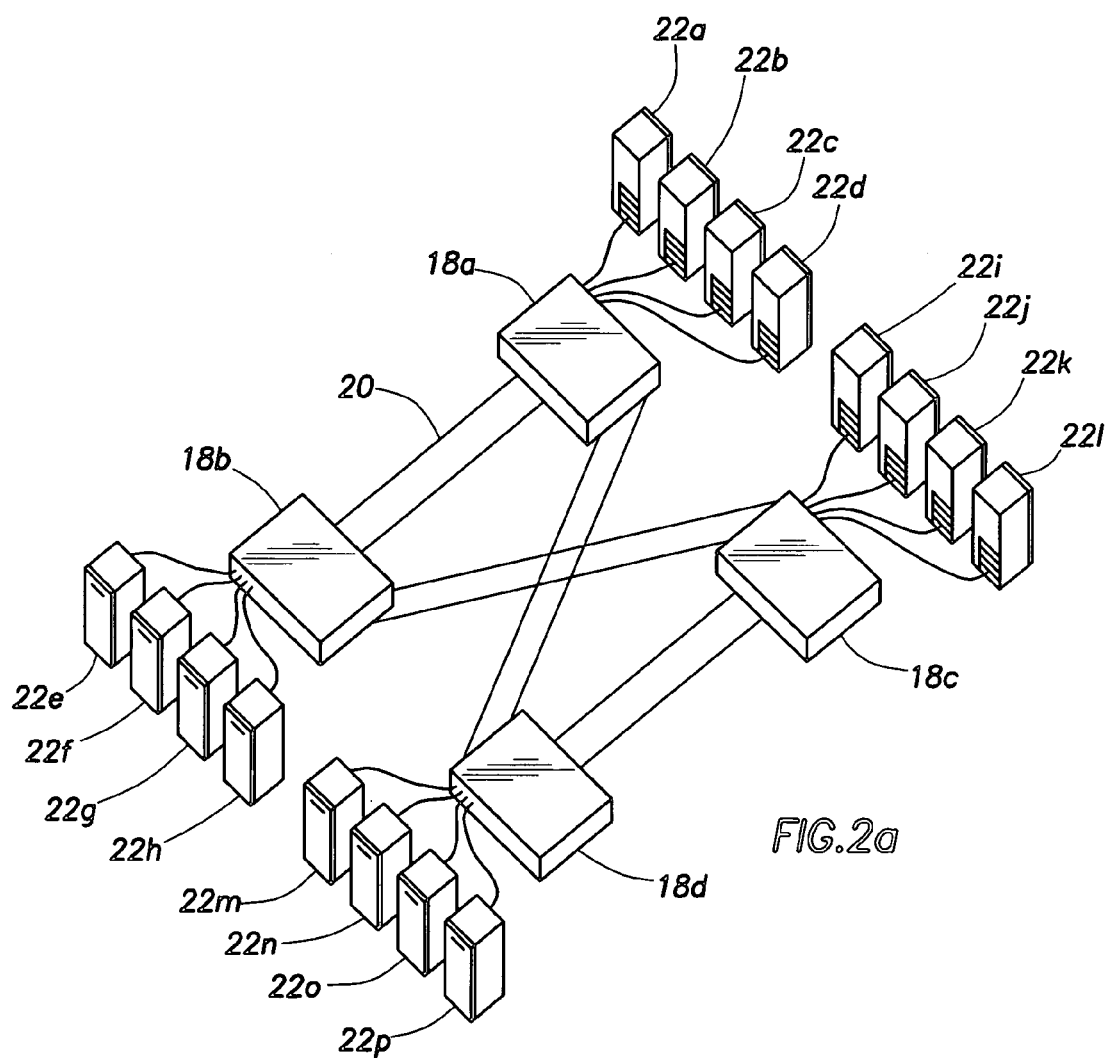
FIG. 2a is a diagram of the internal topology of a 16-port network switch without the module.

FIG. 2a shows the internal topology of the sixteen port switch 10 shown in FIG. 1 without module 16. Generally, switch 10 comprises one or more routing components 18 that are operable to communicatively couple devices 22 via interconnections or links 20. Routing components 18 are preferably application specific integrated circuit (ASIC) based chips. As opposed to general purpose integrated circuits, ASICs are typically custom chips designed for a specific application by integrating standard cells from an existing library. In this case, the ASIC based chips are designed for routing operations.

The switch 10 illustrated in FIG. 2a contains four 8-by-8 intermediate routing components 18. An 8-by-8 routing component 18 is operable to support eight links 20. As discussed above, devices 22 may be workstations, computer systems, servers, SAN storage devices or any other device suitable for coupling to a computer network. The switch 10 shown in FIG. 2a only provides two links 20 between every four pairs of devices 22. For example, between computers 22a through 22d and computers 22e through 22h, there are only two links 20. Thus, communications between one pair of devices must be transmitted through the same link used by another pair of devices. As a result, devices 22 cannot communicate with each other at the full network throughput. Accordingly, the switch 10 shown in FIG. 2a only allows for a lean-tree topology, rather than a fat-tree topology, because the bandwidth between the routing components is not full. While the switch 10 shown in FIG. 2a has enough routing components 18 and associated links 20 to support sixteen devices 22, switch 10 does not have enough routing components 18 to support sixteen devices 22 with full bandwidth.

Figure 2B:
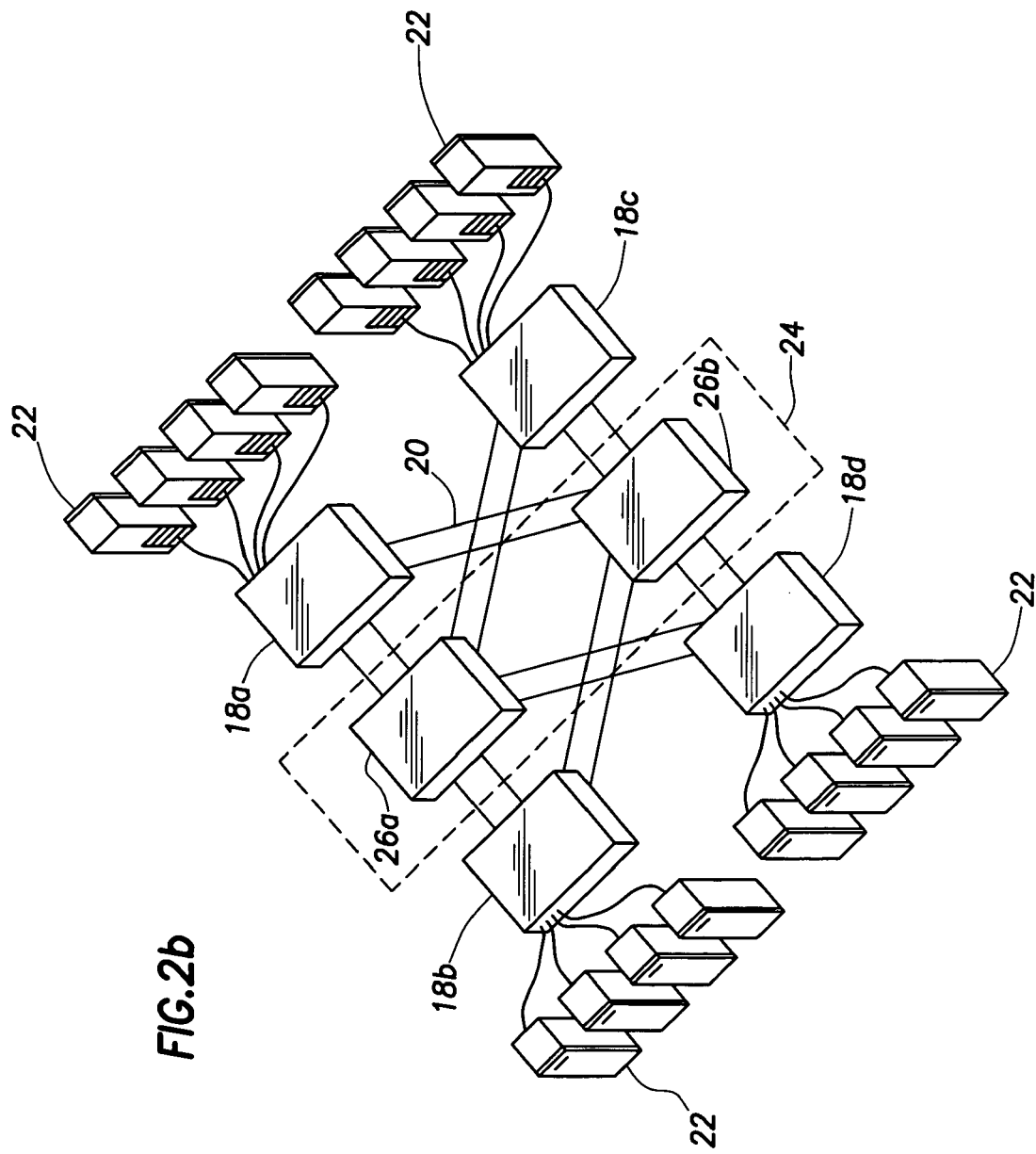
FIG. 2b is a diagram of the internal topology of a 16-port network switch with the module.

FIG. 2b shows the internal topology of the sixteen port switch 10 shown in FIG. 1, wherein module 16 has been coupled to switch 10. Module 16 comprises two additional 8-by-8 routing components 26. The interconnections for communicatively coupling the routing components 26 of module 10 with the intermediate routing components 18 of switch 10 may be contained in module 16 or module interface 14. The additional routing components 26 and links 20 corresponding to module 16 are shown in area 24.

One goal of the present network switch is to allow for an increase in the message transmission bandwidth of switch 10. One measurement of bandwidth is the bisectional bandwidth in bytes per second. The incorporation of the additional routing components 26 results in an increase in the bisectional bandwidth for switch 10. Bisectional bandwidth is a common measure of the effectiveness of a computer network's interconnectivity. Bisectional bandwidth is generally defined as the minimum bandwidth across all the possible planes that can divide a given network into two sets such that each set has an equal number of nodes. Alternatively, the bisectional bandwidth may be determined by dividing a system in half and counting the number of cut connections that normally would have allowed one half of the system to communicate with the other half. Thus, the bisectional bandwidth is a worst-case bandwidth measurement. A low bisectional bandwidth for a network generally indicates the existence of a bottleneck that limits system throughput. A high bisectional bandwidth is desirable because it indicates that data is being transmitted between the nodes of the network at a high bandwidth. Due to the increased number of links 20, the bisectional bandwidth for the switch shown in FIG. 2b is higher than that for the switch shown in FIG. 2a.

Figure 2C:
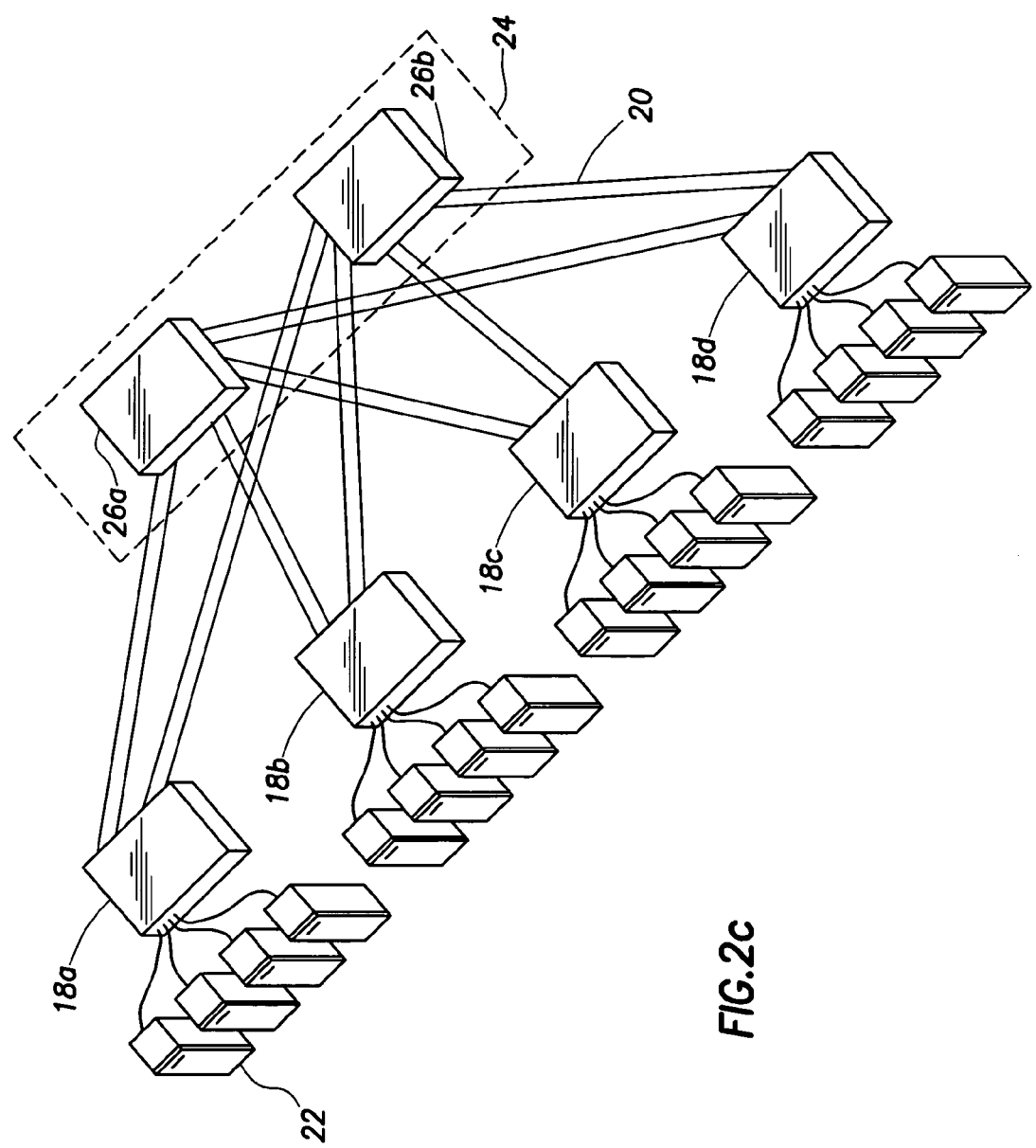
FIG. 2c is a conceptual diagram of the internal topology of a 16-port network switch with the module.

FIG. 2c is a conceptual view of the topology of the switch shown in FIG. 2b. As shown in FIG. 2c, the two routing components 26 of module 16 effectively add a second layer of connections or links, resulting in a fat-tree topology. The switch shown in FIG. 2 now provides four pairs of links 20 between every four pairs of devices 22. For example, there are now four links between computers 22a through 22d and computers 22e through 22h. As a result, devices 22 can communicate with each other at the full network throughput. In this case, the incorporation of 50% more routing components has doubled the bisectional bandwidth of switch 10. Thus, the incorporation of module 16 increases the internal connectivity of switch 10 to allow for full bisectional bandwidth.

The present network switch is not limited to the particular configuration shown in FIGS. 1 through 2. For example, the switch may incorporate more or less routing components, or incorporate different types of routing components. Shown in FIG. 3 is a thirty-two port switch 28, with ports 30, and module interface 32 operable for accepting module 34 such that module 34 is communicatively coupled with switch 28. FIG. 4a shows the internal topology of the thirty-two port switch 28 shown in FIG. 3. Similar to switch 10 shown in FIG. 2a, switch 28 also uses 8-by-8 routing components. However, switch 28 initially contains eight 8-by-8 routing components 34, instead of four. As a result, switch 28 is operable to support thirty-two devices 38 via ports 30 instead of sixteen. However, while the switch 28 has enough intermediate routing components 34 to support thirty-two devices 38, switch 28 does not have enough routing components 34 to support thirty-two devices 38 with full bandwidth. In other words, switch 28 does not provide a sufficient number of links 36 between intermediate routing components 34 to allow devices 34 to communicate with each other at the full network throughput.

FIG. 4b shows the internal topology of the thirty-two port switch 28 shown in FIG. 3, wherein the module 34 has been coupled to switch 28. Module 34 comprises four additional 8-by-8 routing components 42. The interconnections for communicatively coupling the routing components 42 of module 34 with the intermediate routing components 34 of switch 28 may be contained in module 34 or module interface 32. The additional routing components 42 and links 36 provided by module 34 are shown in area 40. Due to the increased number of routing components 34 and 46, and the corresponding increase in links 36, module 34 has enhanced the internal topology of switch 28. As a result, the bisectional bandwidth of switch 28 has been increased.

Figure 6A:
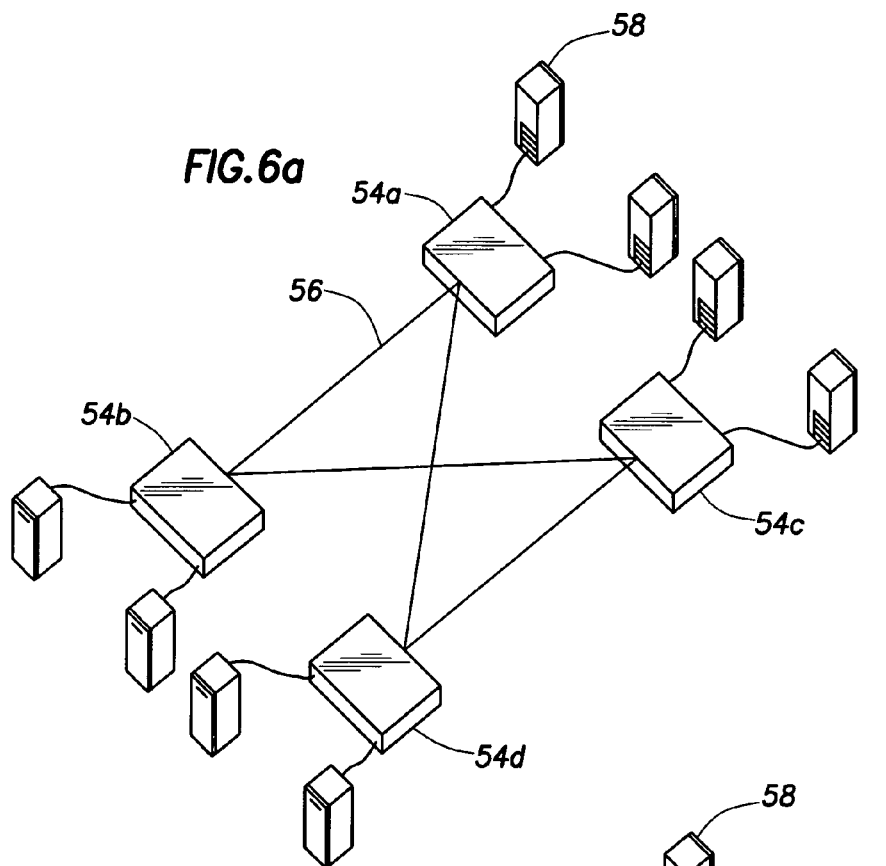
FIG. 6a is a diagram of the internal topology of an 8-port network switch without the module.

The present network switch may also be used for switches that incorporate different types of routing components. FIG. 5 shows a eight port switch 44, with ports 46 and module interface 50 operable to receive module 52 such that module 52 is communicatively coupled with switch 44. FIG. 6a shows the internal topology of the eight port switch 28 shown in FIG. 5. Instead of using 8-by-8 routing components, switch 44 initially contains four 4-by-4 routing components 54. Each four-by-four routing component 54 is operable to support four links 56. As a result, switch 44 is operable to support eight devices 58 via ports 46. However, while the switch 44 has enough intermediate routing components 54 to support eight devices 58, switch 44 does not have enough routing components 54 to support eight devices 58 with full bandwidth. In other words, switch 44 does not provide a sufficient number of links 56 between intermediate routing components 54 to allow devices 58 to communicate with each other at the full network throughput.

Figure 6B:
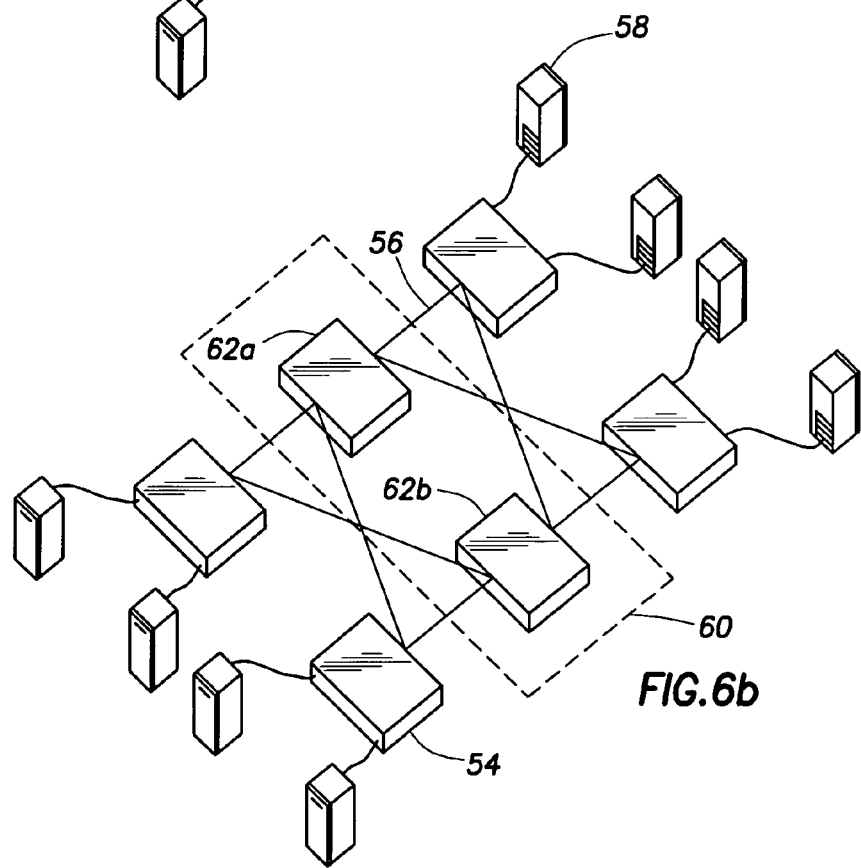
FIG. 6b is a diagram of the internal topology of an 8-port network switch with the module.

FIG. 6b shows the internal topology of the eight port switch 44 shown in FIG. 5, wherein the module 52 has been coupled to switch 44. Module 52 comprises two additional 4-by-4 routing components 62. As discussed above, the interconnections for communicatively coupling the routing components 62 of module 52 with the intermediate routing components 54 of switch 44 may be contained in module 52 or module interface 50. The additional routing components 62 and links 56 provided by module 52 are shown in area 60. Due to the increased number of routing components 54 and 62, and the corresponding increase in links 56, module 44 has enhanced the internal topology of switch 44. As a result, the bisectional bandwidth of switch 44 has been increased.

As discussed above, the disclosed network switch may be used for switches that incorporate 4-by-4, 8-by-8, 16-by-16, or any other sized routing component. In addition, the disclosed network switch may be used for switches that incorporate any number of routing components. Furthermore, the present network switch may be used for any type of computer network that utilizes switches and routing components. Thus, the disclosed network switch may be applied to any kind of switch design that uses routing components in order to increase the connectivity of the switch.

Although the disclosed embodiments have been described in detail, it should be understood that various changes, substitutions, and alterations can be made to the embodiments without departing from their spirited scope.

What is claimed is:

1. A computer switching system comprising:
   a removable module; and
   a switch operable to communicatively couple a plurality of devices,
   wherein the removable module is external to the switch;
   wherein the switch is operable to receive the removable module, and wherein the switch comprises a switching fabric;
   wherein the removable module comprises one or more module routing components operable to communicatively couple the devices when the removable module is received by the switch, and wherein the removable module comprises at least a portion of the switching fabric.

2. The switching system of claim 1, wherein the switch further comprises one or more intermediate routing components operable to communicatively couple with the module routing components when the removable module is received by the switch.

3. The switching system of claim 2, wherein the module routing components are the same type as the intermediate routing components.

4. The switching system of claim 2, wherein the intermediate routing components and module routing components are ASIC-based routing components.

5. The switching system of claim 2, wherein the number of module routing components is equal to half the number of intermediate routing components.

6. The switching system of claim 1, wherein the switch is operable to receive a plurality of removable modules.

7. A method for upgrading the bisectional bandwidth of a network comprising a plurality of devices, comprising the steps of:
   providing a network switch operable to communicatively couple the devices attached to the network, wherein the network switch comprises a module interface operable to receive a module and wherein the switch comprises a switching fabric;
   providing a removable module comprising one or more module routing components operable to communicatively couple the devices when the removable module is received by the network switch, wherein the removable module is external to the switch and wherein the removable module comprises at least a portion of the switching fabric; and
   receiving the removable module.

8. The method of claim 7, wherein the network switch further comprises one or more intermediate routing components operable to communicatively couple with the module routing components when the removable module is received by the network switch.

9. The method of claim 8, wherein the module routing components are the same type as the intermediate routing components.

10. The method of claim 8, wherein the intermediate routing components and module routing components are ASIC-based routing components.

11. The method of claim 8, wherein the number of module routing components is equal to half the number of intermediate routing components.

12. The method of claim 7, wherein the network switch is operable to receive a plurality of removable modules.

* * * * *